(12) United States Patent
DeBerry et al.

(10) Patent No.: US 10,435,957 B2
(45) Date of Patent: Oct. 8, 2019

(54) CAM-STYLE ANTI-ROTATION DEVICE FOR CONNECTOR ASSEMBLY

(71) Applicant: Dril-Quip, Inc., Houston, TX (US)

(72) Inventors: Blake T. DeBerry, Houston, TX (US); Morris B. Wade, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 547 days.

(21) Appl. No.: 15/169,150

(22) Filed: May 31, 2016

(65) Prior Publication Data

US 2016/0356097 A1 Dec. 8, 2016

Related U.S. Application Data

(60) Provisional application No. 62/169,951, filed on Jun. 2, 2015.

(51) Int. Cl.
*E21B 17/043* (2006.01)
*F16L 15/08* (2006.01)

(52) U.S. Cl.
CPC ............ *E21B 17/043* (2013.01); *F16L 15/08* (2013.01)

(58) Field of Classification Search
CPC ................................ E21B 17/043; F16L 15/08
USPC ................................................. 285/87, 90–92
See application file for complete search history.

(56) References Cited

U.S. PATENT DOCUMENTS

| | | | | |
|---|---|---|---|---|
| 695,659 A | * | 3/1902 | Snyder | E21B 17/043 279/100 |
| 715,861 A | * | 12/1902 | Preston | E21B 17/043 279/100 |
| 1,064,527 A | * | 6/1913 | Norris | E21B 17/043 279/100 |
| 1,639,813 A | * | 8/1927 | Schawrow | F16L 37/16 285/148.19 |
| 3,521,911 A | * | 7/1970 | Hanes | E21B 17/085 285/27 |
| 8,690,200 B1 | * | 4/2014 | Patterson, Jr. | E21B 17/08 285/403 |
| 2014/0103640 A1 | * | 4/2014 | O'Dell | E21B 17/046 285/91 |
| 2014/0103645 A1 | * | 4/2014 | Steen | F16L 15/08 285/330 |
| 2014/0125053 A1 | * | 5/2014 | Raynal | E21B 17/043 285/333 |

* cited by examiner

*Primary Examiner* — Anna M Momper
*Assistant Examiner* — Fannie C Kee
(74) *Attorney, Agent, or Firm* — Baker Botts L.L.P.

(57) ABSTRACT

An improved anti-rotation device designed to prevent rotation of a first threaded portion of a connector assembly with respect to a second threaded portion of the connector assembly is provided. The anti-rotation device may be an integral part of one end of the connector assembly, so that the anti-rotation device cannot become lost before the first and second threaded sections are coupled together. The anti-rotation key may be rotatably coupled to the first threaded portion and may be easily transitioned from an unlocked position within the connector assembly to a locked position that prevents rotation of the threaded portions relative to each other.

20 Claims, 4 Drawing Sheets

CAM-STYLE ANTI-ROTATION DEVICE FOR CONNECTOR ASSEMBLY

CROSS REFERENCE TO RELATED APPLICATIONS

The present application claims priority to U.S. provisional application Ser. No. 62/169,951, entitled "Anti-Rotation Device for Connector Assembly", filed on Jun. 2, 2015.

TECHNICAL FIELD

The present disclosure relates generally to connector assemblies for coupling strings of tubular and other components and, more particularly, to anti-rotation devices used to prevent rotation of threaded connector assemblies.

BACKGROUND

Offshore oil and gas drilling operations typically include the make-up of strings of pipe or casing members, frequently of relatively large diameter. The tubular strings may be driven into the ground underwater to be used for anchoring the drilling platform. Such strings are also used as conduits in the water through which a well may be initiated. The joint between members of such tubular strings must provide both structural strength and fluid pressure integrity. Such features of a joint might be provided, for example, by welding. However, because welding is a time-consuming operation, and drilling rig rates are high, particularly offshore, mechanical connectors are generally preferred. Typical mechanical connectors available include threaded type connectors in which tubular members are mutually rotated to thread a pin and box connector assembly, breach block connectors, and snap lock connectors.

In threaded mechanical connector assemblies an externally threaded end, known as the pin, mates with an internally threaded section, known as the box. The pin and the box on a threaded connector assembly are designed to be engaged with each other and rotated to a specific torque value for connecting the ends. After the connection is made, anti-rotation devices can be installed to secure the pin and the box together at the desired make-up torque. The anti-rotation devices are designed to ensure that the threaded portions of the connector assembly do not become tightened over the desired make-up torque or loosened from each other in response to forces applied to the pipe or casing members in the string.

Existing anti-rotation devices often feature a mechanical key that can be selectively positioned in a recess between the pin and the box of the connector assembly to prevent rotation of the pin and the box relative to each other in a certain direction once the make-up torque is reached. Unfortunately, these keys typically do not go into action to engage with the connector assembly until after the connection is loosened slightly. That is, the keys are generally first positioned in the recesses of the connector assembly, and then the pin and box are rotated slightly relative to each other to energize the key. As a result, the connection may be secured at a different torque than the initial desired make-up torque.

In addition, some existing anti-rotation keys are designed to interface very closely with the connector assembly to fill a recess therein. As such, these keys can be difficult to position in the corresponding recess and often must be hammered into engagement with the connector assembly using a large amount of force. This hammering process takes an undesirable amount of time and energy to ensure that the keys are lodged into their respective recesses in the connector assembly.

Furthermore, these keys are provided as separate pieces from the rest of the connector assembly. The keys are generally installed within the recesses only after the connection is made. As a result, the keys can be difficult to keep track of and become lost on the rig platform prior to their installation into the connector assembly.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
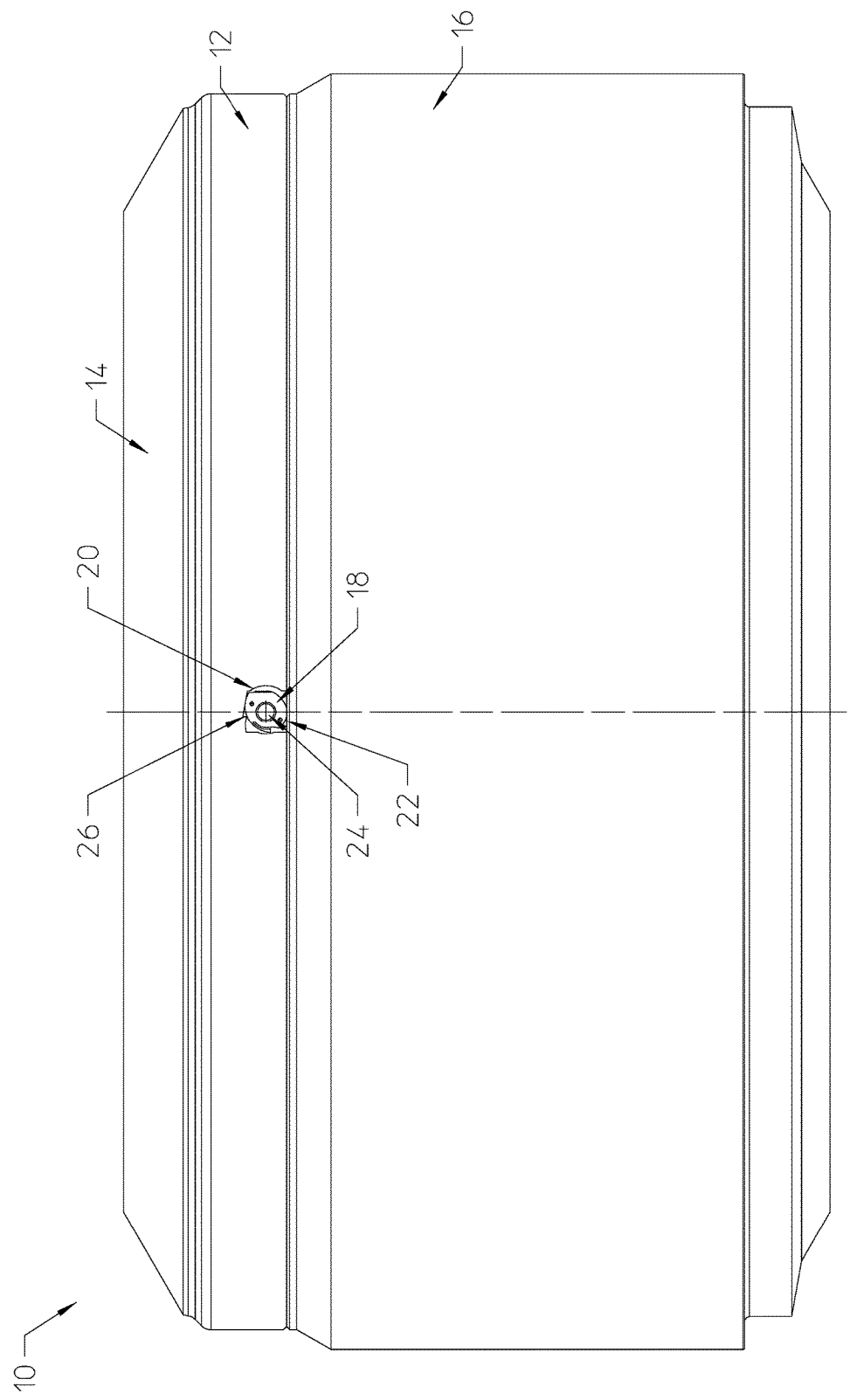
FIG. 1 is a front view of a connector assembly with a cam-style anti-rotation device, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to an improved anti-rotation device designed to prevent rotation of a first threaded portion of a connector assembly with respect to a second threaded portion of the connector assembly. Existing systems utilize an anti-rotation key that is initially separate from the connector assembly and must be hammered into a tight space, and this can take an undesirable amount of time to secure the key within the connector assembly. In addition, since the keys are initially separate components from the connector assembly, they can become lost or damaged prior to the threaded portions of the connector assembly being coupled together.

The disclosed anti-rotation device may be an integral part of one end of the connector assembly, so that the anti-rotation device cannot become lost before the first and second threaded sections are coupled together. The anti-rotation key may be rotatably coupled to the first threaded portion and may be easily transitioned from an unlocked position within the connector assembly to a locked position that prevents rotation of the threaded portions relative to each other.

The presently disclosed anti-rotation device may be disposed in a recess formed into the first threaded portion, and may be rotatably coupled to the first threaded portion via a bolt extending through the anti-rotation device. The anti-rotation device may be a cam-style anti-rotation device. That is, the anti-rotation device may include a cam-shaped or cam-style member that has a spring-loaded feature on one side and a plurality of teeth on an opposite side. The spring-loaded feature is used to engage a shoulder on the first threaded portion, this shoulder extending partially into the recess. The plurality of teeth are used to engage an engagement surface of the second threaded portion. When the anti-rotation device is in the unlocked position, the spring-loaded feature and the plurality of teeth may not be engaged with either of the threaded portions. However, once the anti-rotation device is rotated into the locked position, the spring-loaded feature may engage with the shoulder of the first threaded portion while the plurality of teeth dig into the engagement surface of the second threaded portion. From this position, if the threaded portions try to rotate relative to each other in a particular direction, the spring-loaded feature and the teeth will push against the respective surfaces of the connector assembly to hold the threaded portions in position.

Turning now to the drawings, FIG. 1 illustrates a system 10 that includes a connector assembly 12 with a first threaded portion 14 and a second threaded portion 16 that may be secured in a desired position relative to each other by an improved anti-rotation device 18. The first threaded portion 14 of the connector assembly 12 may be an externally threaded end, known as the "pin", while the second threaded portion 16 is an internally threaded section, known as the "box".

The pin and box are designed to be threaded together to connect a first tubular component (not shown) to a second tubular component (not shown). In some embodiments, the pin is formed into the first tubular component and the box is formed into the second tubular component, such that the connector assembly 12 is integral to the tubular components being connected. In other embodiments, the pin and the box may be separate components that are attached to their respective tubular components as desired to facilitate the connection. However, the present disclosure is not limited to any specific configuration of the pin and box relative to the tubular components being connected.

When forming these tubular connections using the connector assembly 12, it is desirable to rotate the first and second threaded portions 14 and 16 relative to each other until the connector assembly 12 reaches a desired make-up torque. Upon reaching this make-up torque, the connection may be secured using one or more anti-rotation devices 18 to prevent the threaded portions 14 and 16 from being rotated away from their designated make-up torque. In FIG. 1, only one such anti-rotation device 18 is illustrated, but it should be noted that in other embodiments any desirable number of anti-rotation devices 18 may be positioned within the connector assembly 12 to prevent further rotation of the threaded portions 14 and 16.

As illustrated, the anti-rotation device 18 is generally disposed within a recess 20 formed in the connector assembly 12 to lock the threaded portions 14 and 16 in a rotational position relative to each other. The recess 20 may be defined by a shaped cutout in the first threaded portion 14, and by an engagement surface 22 located on the second threaded portion 16. The illustrated recess 20 is designed to allow rotation of the anti-rotation device 18 in one direction relative to the connector assembly 12, to move the anti-rotation device 18 from an unlocked position to a locked position.

The anti-rotation device 18 may be a piece formed from powder metal (or some other material) cast in a shape that includes features for interfacing with the connector assembly 12. The anti-rotation device 18 may be shaped in a way that enables the anti-rotation device 18 to be moved from an unlocked position relative to the connector assembly 12 to a locked position, as described in detail below. When the anti-rotation device 18 is in the unlocked position, it enables the first threaded portion 14 to be rotated relative to the second threaded portion 16. When the anti-rotation device 18 is in the locked position, it prevents the first threaded portion 14 from rotating in a certain direction relative to the second threaded portion 16.

The anti-rotation device 18 may be rotatably coupled to the first threaded portion 14 of the connector assembly 12 via a bolt 24 (or some other coupling mechanism). The bolt 24 may extend through an aperture in the anti-rotation device 18 to secure the device 18 to the connector assembly 12. The anti-rotation device 18 may be able to rotate about the axis of the bolt 24, with the bolt 24 acting as a shaft that rotatably couples the anti-rotation device 18 to the connector assembly 12.

The presently disclosed anti-rotation device 18 may be rotatably coupled to the first threaded portion 14 of the connector assembly 12 before the first threaded portion 14 is coupled to the second threaded portion 16. For example, the anti-rotation device 18 may be pre-installed onto the first threaded portion 14 prior to delivery of the connector assembly portions to a wellsite. Since the anti-rotation devices 18 do not have to be installed at the wellsite, the anti-rotation devices 18 may facilitate relatively easy installation of the system 10, as compared to existing systems that utilize separate anti-rotation keys. In addition, the anti-rotation devices 18 cannot become lost at the wellsite, since they are already attached to the corresponding connector assembly 12.

The first threaded assembly 14 may include a shoulder 26 protruding partially into the recess 20. As described in detail below, the anti-rotation device 18 may include a spring-loaded feature designed to be rotated into engagement with this shoulder 26, to move the anti-rotation device 18 to a locked position. In the locked position, the anti-rotation device 18 may be fixed between the shoulder 26 of the first threaded portion 14 and the engagement surface of the second threaded portion 16.

It should be noted that variations on the illustrated system 10 may be used in other embodiments. For example, in other embodiments the pin and the box sections of the connector assembly 12 may be reversed, such that the box acts as the first threaded portion 14 having the shoulder 26 and the pin acts as the second threaded connection 16 having the engagement surface 22.

Figure 2A:
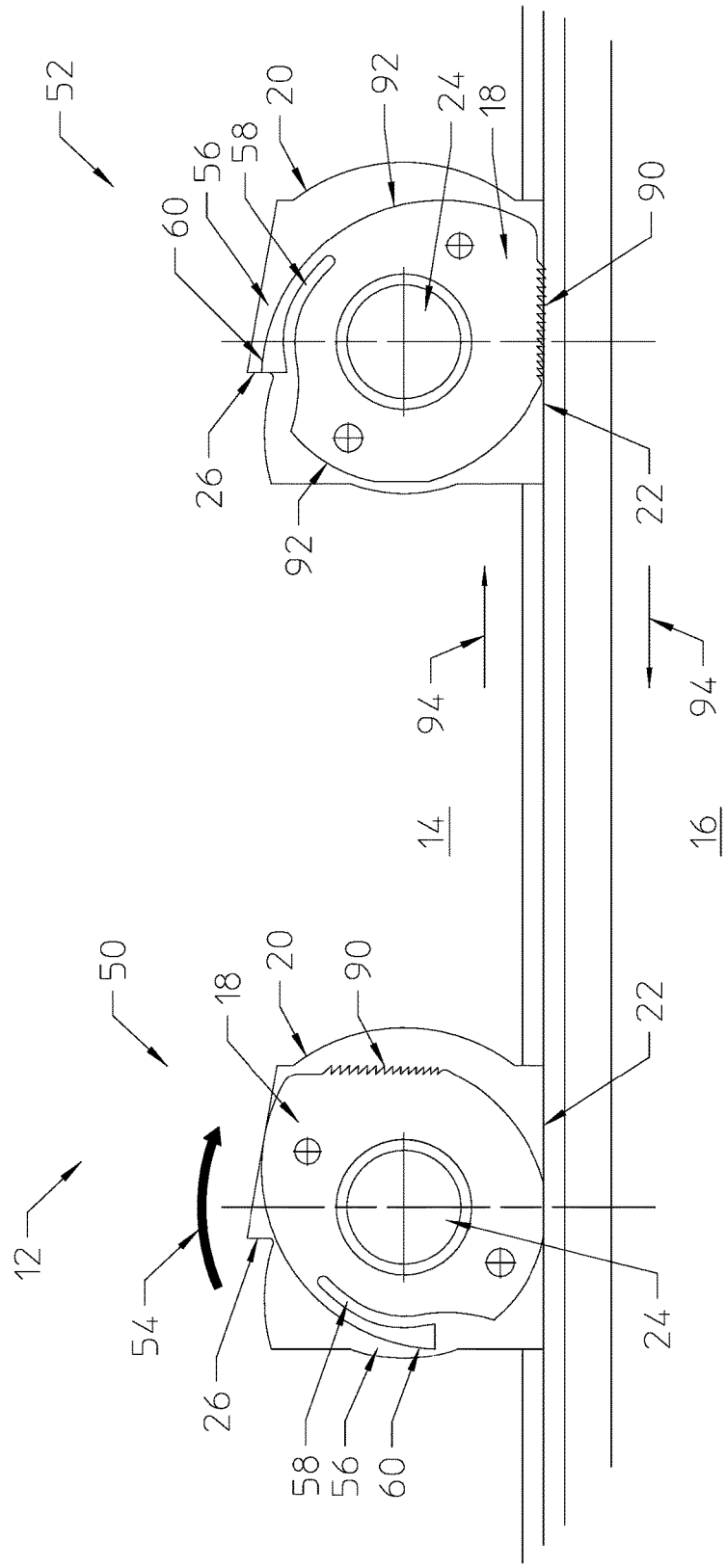
FIG. 2A is a front view of two anti-rotation devices, one disposed in an unlocked position and the other in a locked position, in accordance with an embodiment of the present disclosure.

FIG. 2A illustrates a more detailed view of an embodiment of the disclosed anti-rotation device 18 and its relationship to the connector assembly 12. FIG. 2A illustrates two anti-rotation devices 18 disposed in two recesses 20 formed within the connector assembly 12. The first anti-rotation device 18 is disposed in an unlocked position 50, while the second anti-rotation device 18 is disposed in a locked position 52. As illustrated, the anti-rotation device 18 may be designed so that a 90° turn 54 of the anti-rotation device 18 within the recess 20 will move the anti-rotation device 18 from the unlocked position 50 to the locked position 52.

The anti-rotation device 18 may initially be installed onto the first threaded portion 14 in the unlocked position 50. Prior to the first threaded portion 14 being rotated into connection with the second threaded portion 16, the anti-rotation device 18 may be able to rotate freely relative to the first threaded portion 14. As mentioned above, the anti-rotation device 18 may be rotatably coupled to the first threaded portion 14 via the bolt 24, which extends through an aperture 55 (shown in FIG. 2B) in the anti-rotation device 18 and into engagement with the first threaded portion 14. The bolt 24 may enable the anti-rotation device 18 to turn relative to the connector assembly 12 about an axis of the bolt 24.

When the threaded portions 14 and 16 are coupled together, the anti-rotation device 18 may be moved from the unlocked position 50 to the locked position 52. Specifically, the anti-rotation device 18 may be rotated so that it snaps into place between the shoulder 26 and the engagement surface 22. The anti-rotation device 18 may be turned using a tool, such as a mechanical tool (e.g., T-handle) or pneumatic tool. Since the anti-rotation device 18 is already part of the connector assembly 12, the pre-installed anti-rotation device 18 may only need to be turned to lock the connector assembly 12 after coupling the threaded portions 14 and 16. This enables easy locking of the connector assembly 12 compared to existing systems, which generally require a separate key to be positioned within and hammered into a locking engagement with the connector.

Figure 2B:
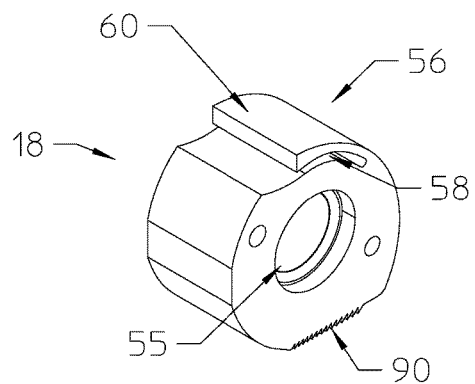
FIG. 2B is a perspective view of the anti-rotation device shown in FIG. 2A, in accordance with an embodiment of the present disclosure.

The anti-rotation device 18 may be formed with certain features that enable the device 18 to selectively lock the connector assembly 12. FIGS. 2A and 2B both illustrate these features of the anti-rotation device 18. The anti-rotation device 18 is used to provide an interference fit between the first and second threaded portions 14 and 16 when it is positioned in the locked position 52. To that end, the anti-rotation device 18 may include a spring-loaded feature 56 designed to engage with the shoulder 26 of the first threaded portion 14 when the anti-rotation device 18 is moved to the locked position 52.

In the illustrated embodiment of FIGS. 2A and 2B, the spring-loaded feature 56 may include a cutout 58 formed through the anti-rotation device 18, and an outer edge 60 of the anti-rotation device 18 disposed just outside the cutout 58. The cutout 58 may generally enable the outer edge 60 to flex when the outer edge 60 is moved against an object (e.g., shoulder 26) that exerts a force on the outer edge 60. That is, as the anti-rotation device 18 is rotated relative to the connector assembly 12, the outer edge 60 may be rotated into contact with the shoulder 26. This may push the outer edge 60 in a radially inward direction. As the shoulder 26 exerts this compressive force onto the outer edge 60 of the anti-rotation device 18, the cutout 58 may enable the outer edge 60 to flex inward (i.e., into the cutout portion 58). This allows the outer edge 60 of the anti-rotation device 18 to pass by the shoulder 26. Once the outer edge 60 is moved beyond the shoulder 26, a restoring force within the spring-loaded feature 56 may push the outer edge 60 back outward and into a locking engagement with the shoulder 26.

As illustrated, the cutout 58 may extend beyond an edge of the anti-rotation device 18 such that the outer edge 60 is an arm or similar protrusion extending over the cutout 58. This may enable relatively easy flexing of the outer edge 60 as the anti-rotation device 18 is moved past the shoulder 26 of the first threaded portion 14.

Figure 3A:
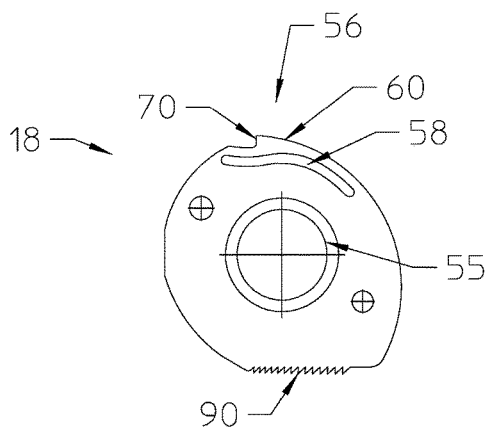
FIGS. 3A and 3B are a front view and a perspective view of an anti-rotation device that may be used in the connector assembly of FIG. 1, in accordance with an embodiment of the present disclosure.
Figure 3B:
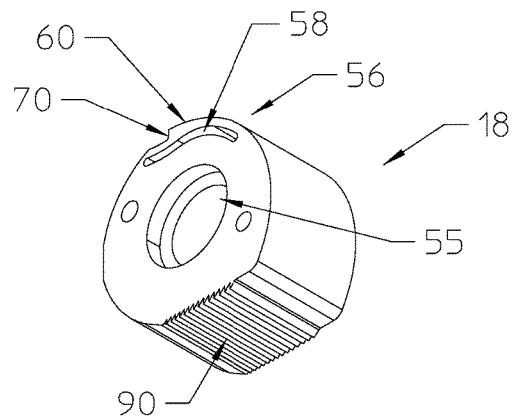

In other embodiments, the cutout 58 may be formed entirely inside the body of the anti-rotation device 18, such that the cutout 58 does not extend beyond the edge of the anti-rotation device 18. One such embodiment of this is illustrated in FIGS. 3A and 3B. In this embodiment, the spring-loaded feature 56 includes the cutout 58, which is fully enclosed between the outer edge 60 and the rest of the anti-rotation device body. In this embodiment, the outer edge 60 may feature a shoulder 70 designed to engage the shoulder 26 of the first threaded portion 14 when the anti-rotation device 18 is rotated to the locked position. This embodiment of the anti-rotation device 18 may provide a desired amount of flexibility of the outer edge 60, while maintaining a relatively stable and closed off anti-rotation device 18.

In still other embodiments, the spring-loaded feature 56 may include a thin material portion of the anti-rotation device 18, with the outer edge 60 disposed over the thin portion. That is, the anti-rotation device 18 may include a thin material portion in the place of the illustrated cutouts 58 of FIGS. 2 and 3 to allow the outer edge 60 to flex as it moves past the shoulder 26 of the first threaded portion 14. This thin material portion may be constructed from a material with a lower stiffness than the material used to construct the rest of the anti-rotation device 18. As the anti-rotation device 18 is rotated past the shoulder 26, the force output from the shoulder 26 to the outer edge 60 may cause the outer edge 60 to flex inward against the lower stiffness (e.g., thin) material portion of the anti-rotation device 18 so the device can continue to rotate to the locked position beyond the shoulder 26. In some embodiments, the thin material portion may extend all the way to an edge of the anti-rotation device 18 (similar to FIGS. 2A and 2B), or it may extend through a fully enclosed portion of the device 18 (similar to FIGS. 3A and 3B).

It should be noted that other types of spring-loaded or biased features 56 may be used in the disclosed anti-rotation device 18 to enable the device 18 to engage with the shoulder 26 after being rotated past the shoulder 26.

In addition to the spring-loaded feature 56, the anti-rotation device 18 may also include a plurality of teeth 90 extending from a surface of the anti-rotation device 18. As illustrated in FIG. 2A, these teeth 90 may be used to engage with the engagement surface 22 of the second threaded portion 16 when the anti-rotation device 18 is in the locked position 52. The plurality of teeth 90 may be disposed on a substantially flat surface of the anti-rotation device 18, thus providing a relatively large surface area for engagement between the teeth 90 and the engagement surface 22. In some embodiments, the arrangement of teeth 90 may be tapered slightly in one direction to provide a better grip on the engagement surface 22 against rotations between the first and second threaded portions 14 and 16.

When the anti-rotation device 18 is rotated to the locked position 52, the spring-loaded feature 56 may engage with the shoulder 26 on the first threaded portion 14 while the teeth 90 engage with the engagement surface 22 of the second threaded portion 16. From this position, if the threaded portions start to rotate relative to each other, the spring-loaded feature 56 and the teeth 90 may continue to engage with the first and second threaded portions 14 and 16 (respectively) to prevent the connector assembly 12 from unlocking.

As illustrated, the anti-rotation device 18 may be relatively cam shaped, with rounded surfaces 92 disposed between the substantially flat surface with the teeth 90 and the spring-loaded feature 56. The recess 20 may be specifically shaped to allow the anti-rotation device 18 to be turned from the unlocked position 50 to the locked position 52. For example, the recess 20 may feature rounded walls formed into the first threaded portion 14 that reach between the engagement surface 22 of the second threaded portion 16 and the shoulder 26 of the first threaded portion 14. It should be noted that other shapes and arrangements of the features that make up the anti-rotation device 18 and the corresponding recess 20 may be utilized in other embodiments.

It should be noted that the illustrated anti-rotation device 18 of FIG. 2A is a right-handed key designed to prevent right-handed turns of the first threaded portion 14 of the connector assembly relative to the second portion 16. A right-handed turn is illustrated by arrows 94. If the first threaded portion 14 moves relative to the second threaded portion 16 in this right-handed direction, the anti-rotation device 18 will apply a stopping force to the first threaded portion 14 via the spring-loaded portion 56 pushing against the shoulder 26 and the teeth 90 digging into the second threaded portion 16.

In some embodiments, it may be desirable for the connector assembly 12 to have at least one right-handed device 18 positioned therein and at least one left-handed device 18 positioned therein. This may prevent rotation of the threaded portions 14 and 16 relative to each other in either direction. These right- and left-handed anti-rotation devices 18 may be positioned at 180 degrees from each other around the circumference of the connector assembly 12. In other embodiments, a greater number of right- and left-handed devices 18 may be pre-installed and locked around the circumference of the connector assembly 12.

Figure 4:
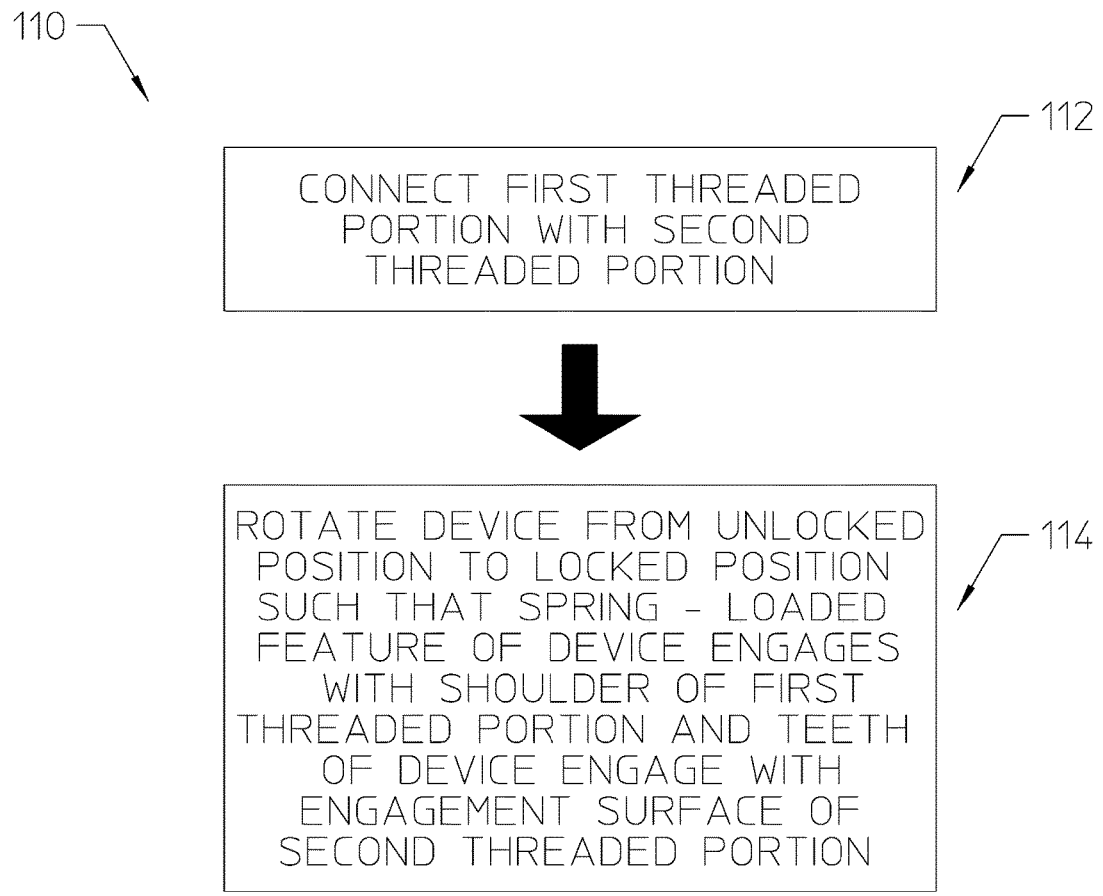
FIG. 4 is a process flow diagram of a method for securing a connector assembly with an anti-rotation device, in accordance with an embodiment of the present disclosure.

FIG. 4 illustrates a method 110 for securely coupling two tubular components using the presently disclosed anti-rotation device 18 and connector assembly 12. The method 110 may include connecting (block 112) the first threaded portion 14 with the second threaded portion 16 of the connector assembly 12 to connect two tubular components. The method 110 may then include rotating (block 114) the anti-rotation device 18 from the unlocked position 50 within the recess 20 to the locked position 52 in the recess 20 such that the spring-loaded feature 56 engages with the shoulder 26 of the first threaded portion 14 and the teeth 90 engage with the engagement surface 22 of the second threaded portion 16. This may involve allowing the spring-loaded feature 56 to flex as the anti-rotation device 18 moves past the shoulder 26, via cutouts 58 or thin material portions formed in the anti-rotation device 18. In addition, rotating the device 18 from the unlocked to the locked position may involve coupling a pneumatic, impact, or mechanical tool (e.g., T-handle) to the anti-rotation device 18 and using the tool to rotate the device 18. Once rotated into the locked position 52, the anti-rotation device 18 may prevent the first threaded portion 14 from rotating with respect to the second threaded portion 16.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
    a connector assembly for connecting two tubular components, wherein the connector assembly comprises a first threaded portion with a recess formed therein and a shoulder protruding partially into the recess, and a second threaded portion with an engagement surface formed therein; and
    an anti-rotation device rotatably coupled to the connector assembly and rotatable about an axis between an unlocked position and a locked position, wherein the anti-rotation device comprises:
        a body with an aperture formed therethrough, wherein the aperture extends through the body in alignment with the axis;
        a spring-loaded feature proximate a radially outer edge of the anti-rotation device taken with respect to the axis, wherein the spring-loaded feature enables the radially outer edge of the anti-rotation device to flex in a radially inward direction relative to the body of the anti-rotation device, wherein the spring-loaded feature engages the shoulder of the first threaded portion when the anti-rotation device is disposed in the locked position; and
        a plurality of teeth that interface with the engagement surface when the anti-rotation device is in the locked position.

2. The system of claim 1, wherein the anti-rotation device is rotatable relative to the connector assembly such that the spring-loaded feature moves past the shoulder on the first threaded portion.

3. The system of claim 1, wherein the spring-loaded feature comprises a cutout formed in the anti-rotation device between the body and the radially outer edge.

4. The system of claim 3, wherein the cutout extends beyond an edge of the anti-rotation device and the outer edge is an arm extending over the cutout.

5. The system of claim 3, wherein the cutout is enclosed within the anti-rotation device between the radially outer edge and the body of the anti-rotation device, and wherein the radially outer edge of the anti-rotation device comprises a shoulder extending radially outward therefrom.

6. The system of claim 1, wherein the spring-loaded feature comprises a thin material portion of the anti-rotation device between the body and the radially outer edge.

7. The system of claim 1, wherein the plurality of teeth extend from a substantially flat surface of the anti-rotation device, and wherein the anti-rotation device comprises rounded surfaces disposed between the substantially flat surface and the spring-loaded feature.

8. The system of claim 1, wherein the plurality of teeth are tapered to provide an enhanced grip between the anti-rotation device and the engagement surface.

9. The system of claim 1, further comprising a bolt disposed through the aperture of the anti-rotation device and rotatably coupling the anti-rotation device to the first threaded portion.

10. The system of claim 1, further comprising a second anti-rotation device, wherein the anti-rotation device prevents rotation of the first threaded portion relative to the second threaded portion in a first direction, and wherein the second anti-rotation device prevents rotation of the first threaded portion relative to the second threaded portion in a second direction opposite the first direction.

11. The system of claim 1, wherein the anti-rotation device is coupled to the first threaded portion prior to a connection of the first and second threaded portions.

12. The system of claim 1, wherein the aperture of the anti-rotation device is located directly between the spring-loaded feature on one side of the anti-rotation device and the plurality of teeth on an opposite side of the anti-rotation device.

13. The system of claim 1, wherein the shoulder of the first threaded portion protrudes into the recess in a radially inward direction taken with respect to the axis.

14. A method, comprising:
connecting a first threaded portion of a connector assembly with a second threaded portion of the connector assembly for connecting two tubular components, wherein the first threaded portion has a recess formed therein and a shoulder protruding partially into the recess, and wherein the second threaded portion has an engagement surface formed therein; and
rotating an anti-rotation device about an axis from an unlocked position to a locked position within the recess, wherein the anti-rotation device is rotatably coupled to the connector assembly, wherein the anti-rotation device comprises:
a body with an aperture formed therethrough, wherein the aperture extends through the body in alignment with the axis;
a spring-loaded feature proximate a radially outer edge of the anti-rotation device taken with respect to the axis, wherein the spring-loaded feature enables the radially outer edge of the anti-rotation device to flex in a radially inward direction relative to the body of the anti-rotation device, wherein the spring-loaded feature engages the shoulder of the first threaded portion when the anti-rotation device is in the locked position; and
a plurality of teeth that interface with the engagement surface of the second threaded portion when the anti-rotation device is in the locked position.

15. The method of claim 14, further comprising preventing the first threaded portion from rotating with respect to the second threaded portion via the anti-rotation device disposed in the locked position.

16. The method of claim 14, further comprising flexing the radially outer edge of the anti-rotation device in the radially inward direction relative to the body of the anti-rotation device as the anti-rotation device rotates past the shoulder in a first direction.

17. The method of claim 16, wherein the spring-loaded feature comprises a cutout formed in the anti-rotation device between the body and the radially outer edge.

18. The method of claim 14, further comprising rotatably coupling the cam-style anti-rotation device to the first threaded portion via a bolt.

19. The method of claim 14, further comprising coupling a tool to the cam-style anti-rotation device and utilizing the tool to rotate the cam-style anti-rotation device from the unlocked position to the locked position.

20. The method of claim 14. wherein the anti-rotation device is coupled to the first threaded portion prior to connecting the first threaded portion with the second threaded portion.

* * * * *